United States Patent
Marchlewski et al.

(10) Patent No.: US 10,589,692 B2
(45) Date of Patent: Mar. 17, 2020

(54) LOCKABLE ROOF ACCESSORY MOUNTING INTERFACE

(71) Applicant: Ford Global Technologies, LLC, Dearborn, MI (US)

(72) Inventors: Jack Marchlewski, Saline, MI (US); Dragan B. Stojkovic, Taylor, MI (US); Joshua Robert Hemphill, White Lake, MI (US); Robert Reiners, Grosse Ile, MI (US); Jeffrey Gray, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 17 days.

(21) Appl. No.: 15/942,918

(22) Filed: Apr. 2, 2018

(65) Prior Publication Data
US 2019/0299871 A1    Oct. 3, 2019

(51) Int. Cl.
| | |
|---|---|
| *E05B 77/00* | (2014.01) |
| *B60R 9/058* | (2006.01) |
| *E05B 79/04* | (2014.01) |
| *E05B 79/08* | (2014.01) |
| *E05B 85/06* | (2014.01) |

(52) U.S. Cl.
CPC .............. *B60R 9/058* (2013.01); *E05B 77/00* (2013.01); *E05B 79/04* (2013.01); *E05B 79/08* (2013.01); *E05B 85/06* (2013.01)

(58) Field of Classification Search
CPC .......... E05B 77/00; E05B 79/04; E05B 79/08; E05B 85/06; B60R 9/058; B60R 9/052; B60R 9/04; B60R 9/00

USPC ...... 70/32–34, 258, 386; 224/321, 325, 326, 224/309
See application file for complete search history.

(56) References Cited

U.S. PATENT DOCUMENTS

| | | | | |
|---|---|---|---|---|
| 3,326,588 | A * | 6/1967 | Clark | E05C 19/16 292/251.5 |
| 3,451,602 | A * | 6/1969 | Bott | B60R 9/04 224/321 |
| 3,712,665 | A | 1/1973 | Klein | |
| 4,132,335 | A * | 1/1979 | Ingram | B60R 9/045 224/324 |
| 4,264,025 | A * | 4/1981 | Ferguson | B60R 9/045 224/321 |
| 4,901,544 | A * | 2/1990 | Jang | B60R 25/0222 70/218 |
| 4,988,026 | A * | 1/1991 | Rasor | B60R 9/045 224/316 |
| 5,096,106 | A * | 3/1992 | Foster | B60R 9/045 16/349 |

(Continued)

FOREIGN PATENT DOCUMENTS

| | | |
|---|---|---|
| EP | 2543548 B1 | 12/2014 |
| EP | 2760703 B1 | 7/2015 |

*Primary Examiner* — Suzanne L Barrett
(74) *Attorney, Agent, or Firm* — David Coppiellie; Carlson, Gaskey & Olds, P.C.

(57) ABSTRACT

A disclosed accessory mount for a vehicle includes a housing with openings, at least one bearing, a lock cylinder movable within the housing and holding the at least one bearing in a locked position extending through the openings and a released position where the at least one bearing is not held within the openings, and a mount including a groove receiving the at least one bearing in the locked position.

16 Claims, 6 Drawing Sheets

(56) References Cited

U.S. PATENT DOCUMENTS

| | | | | |
|---|---|---|---|---|
| 5,195,669 A * | 3/1993 | Duemmler | B60R 9/045 | 224/315 |
| 5,320,264 A * | 6/1994 | Weir | B60R 9/048 | 224/321 |
| 5,388,434 A * | 2/1995 | Kalis | B60R 11/02 | 248/553 |
| 5,428,873 A * | 7/1995 | Hitchcock | E05B 17/2011 | 24/303 |
| 5,553,761 A * | 9/1996 | Audoire | B60R 9/045 | 224/321 |
| 5,577,649 A * | 11/1996 | Lee, Jr. | B60P 7/135 | 224/315 |
| 6,038,892 A * | 3/2000 | Schmitt | E05C 3/042 | 292/152 |
| 6,158,637 A * | 12/2000 | Fisch | B60R 9/04 | 224/309 |
| 6,684,670 B1 * | 2/2004 | Agbay | E05B 67/365 | 70/14 |
| 6,746,073 B2 | 6/2004 | Heller et al. | | |
| 6,904,775 B2 * | 6/2005 | Makos | E05B 13/105 | 70/16 |
| 7,775,071 B2 * | 8/2010 | Agbay | E05B 21/066 | 70/164 |
| 8,348,111 B2 * | 1/2013 | Heuchert | B60R 9/048 | 224/321 |
| 9,725,045 B2 * | 8/2017 | Johansson | B60R 9/058 | |
| 10,160,393 B2 * | 12/2018 | Ranka | B60R 9/052 | |
| 2004/0118886 A1 * | 6/2004 | Mirshafiee | B60R 9/045 | 224/315 |
| 2005/0217324 A1 * | 10/2005 | Miao | E05C 1/06 | 70/134 |
| 2006/0283900 A1 * | 12/2006 | Stapleton | B60R 9/045 | 224/325 |
| 2007/0137266 A1 * | 6/2007 | Hsai | B60D 1/60 | 70/34 |
| 2009/0321485 A1 * | 12/2009 | Jamieson | B60R 9/04 | 224/309 |
| 2011/0192870 A1 * | 8/2011 | Michie | B60R 9/048 | 224/309 |
| 2015/0102077 A1 * | 4/2015 | Martin | B60R 9/00 | 224/405 |

* cited by examiner

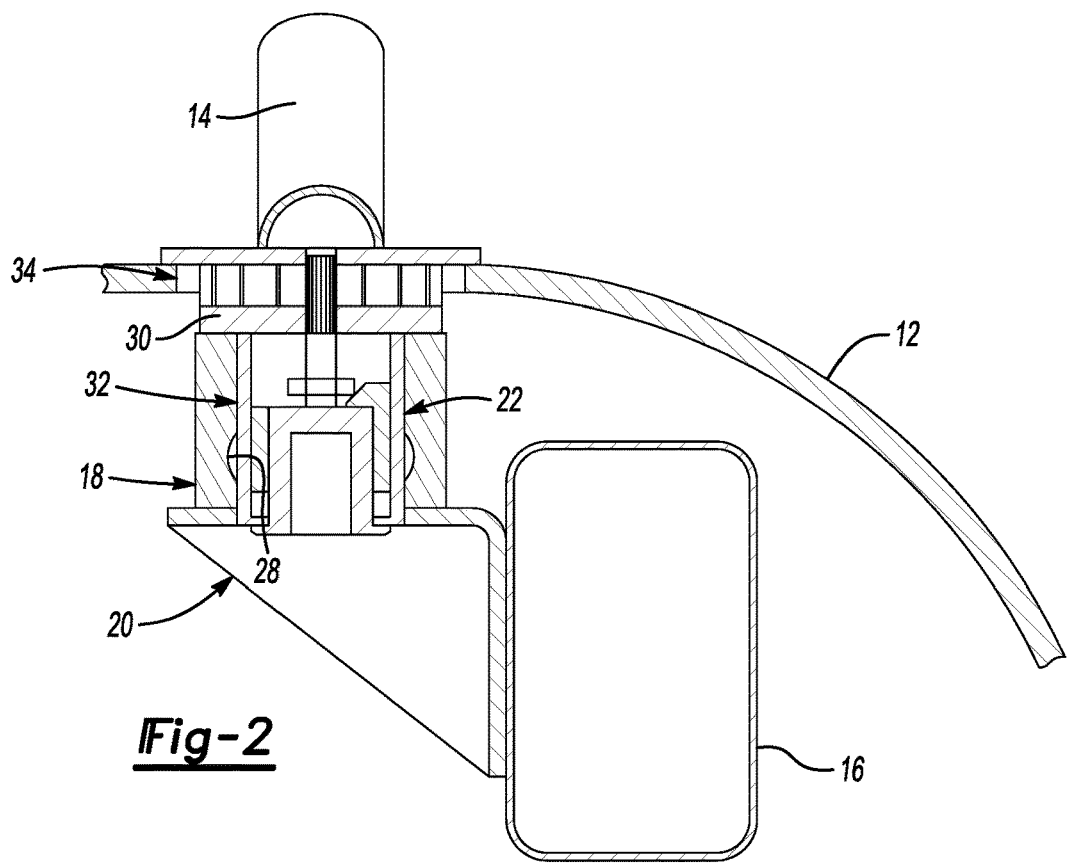
Fig-2
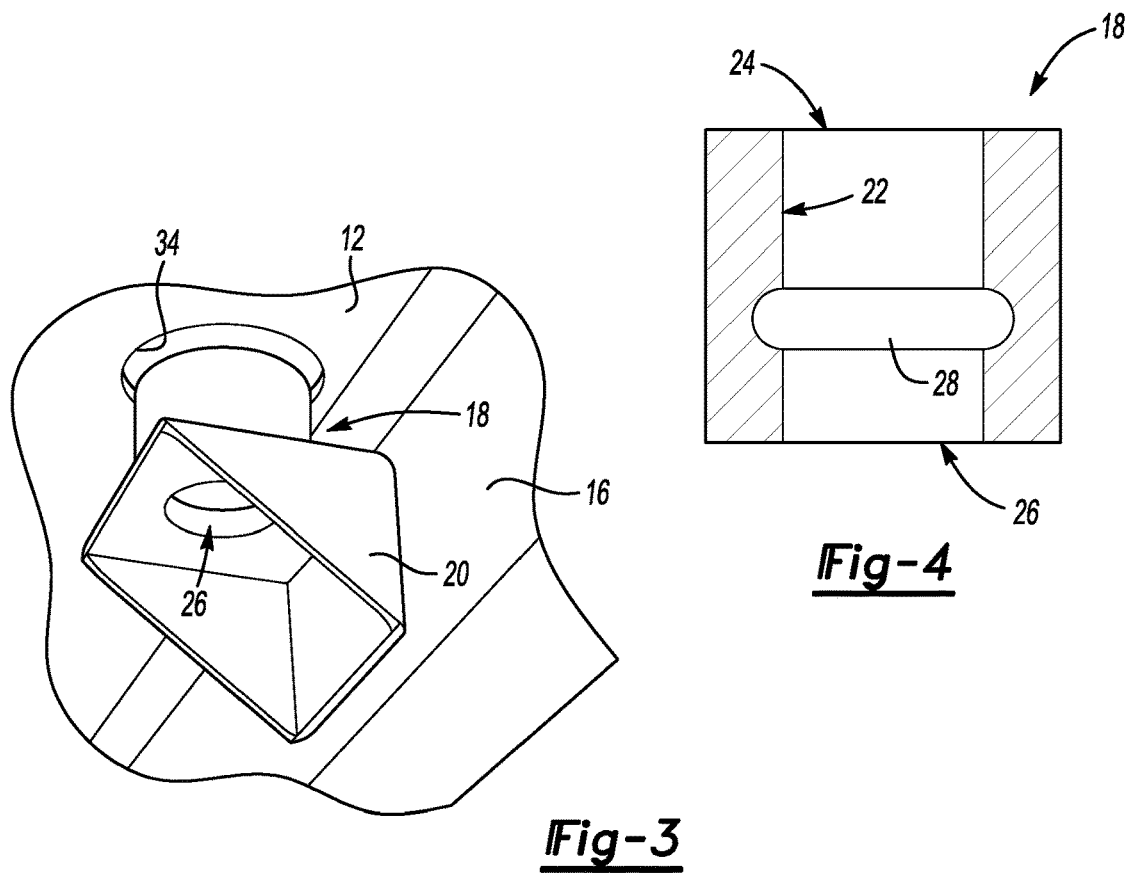
Fig-3
Fig-4

LOCKABLE ROOF ACCESSORY MOUNTING INTERFACE

TECHNICAL FIELD

This disclosure relates to an interface for accessory items mounted to a vehicle with a removable roof structure.

BACKGROUND

Vehicles may include a roof structure that can be removed to provide an open air experience for occupants. Some vehicles provide the open air experience with a convertible top that includes the support structure. Other vehicle designs include removable panels that are attached to a fixed support structure. Once the panels are removed the support structure remains in place.

Automotive suppliers and manufactures continually seek increases in efficiencies while introducing new features to enhance consumer approval and interest.

SUMMARY

An accessory mount for a vehicle according to an exemplary aspect of the present disclosure includes, among other things, a housing including openings, at least one bearing, a lock cylinder movable within the housing for holding the at least one bearing in a locked position extending through the openings and a released position wherein the at least one bearing is not held within the openings, and a mount including a groove receiving the at least one bearing in the locked position.

In a further non-limiting embodiment of the foregoing accessory mount, a lever coupled to the lock cylinder and disposed within the housing, wherein the housing includes a flange for holding the lever in the locked position.

In a further non-limiting embodiment of the foregoing accessory mount, a biasing member biases the lever and the lock cylinder toward the release position.

In a further non-limiting embodiment of the foregoing, accessory mount, the flange includes a slot and the lever is movable through the slot in the released position.

In a further non-limiting embodiment of the foregoing accessory mount, the at least one bearing is held between a bottom surface of the flange and the lock cylinder such that movement of the locking cylinder into the housing pushes the at least one bearing outward partially through the openings in the housing and at least partially within the groove of the mount.

In a further non-limiting embodiment of the foregoing accessory mount, the lock cylinder includes a slot receiving a key to enable rotational movement of the lock cylinder within the housing.

In a further non-limiting embodiment of the foregoing accessory mount, wherein rotation of the lock cylinder moves the lever into alignment with the slot to enable movement to the release position.

In a further non-limiting embodiment of the foregoing accessory mount, a shaft couples the lever and the lock cylinder.

In a further non-limiting embodiment of the foregoing accessory mount, the mount includes a cylinder with an inner bore including the groove and the housing comprises a cylinder received within the inner bore such that the openings align with the groove in the locked position.

In a further non-limiting embodiment of the foregoing accessory mount, the mount includes a mounting flange securable to a fixed structure of the vehicle.

In a further non-limiting embodiment of the foregoing accessory mount, the housing is received through a top opening of the inner bore and the lock cylinder is accessible through a bottom opening of the bore.

A roof accessory for a motor vehicle according to another exemplary aspect of the present disclosure includes, among other things, a housing including openings, at least one bearing, and a lock cylinder movable within the housing and holding the at least one bearing in a locked position extending through the openings and a released position such that the at least one bearing is not held within the openings.

In a further non-limiting embodiment of any of the foregoing roof accessories, a lever is coupled to the lock cylinder and disposed within the housing and a biasing member, wherein the housing includes a flange for holding the lever in the locked position and the biasing member biases the lever toward the released position.

In a further non-limiting embodiment of any of the foregoing roof accessories, the at least one bearing is held between a bottom surface of the flange and lock cylinder such that movement of the locking cylinder into the housing pushes the at least one bearing outward partially through the openings in the housing and at least partially within a groove of a mount.

In a further non-limiting embodiment of any of the foregoing roof accessories, the lock cylinder includes a slot receiving a key to enable rotational movement of the lock cylinder within the housing and rotation of the lock cylinder moves the lever into alignment with the slot to enable movement to the release position.

In a further non-limiting embodiment of any of the foregoing roof accessories, the housing is cylindrical and receivable within an inner bore of a mount, wherein the inner bore includes a groove for receiving the at least one bearing in a locked position.

In a further non-limiting embodiment of any of the foregoing roof accessories, the housing is received through a top opening of the inner bore and the lock cylinder is accessible through a bottom opening of the bore.

The various features and advantages of this disclosure will become apparent to those skilled in the art from the following detailed description. The drawings that accompany the detailed description can be briefly described as follows.

BRIEF DESCRIPTION OF THE DRAWINGS

FIG. 2 is a cross-sectional view of an example roof accessory lock assembly.

FIG. 3 is a perspective view of an example mount.

FIG. 4 is a cross-sectional view of the example mount.

DETAILED DESCRIPTION

Figure 1:
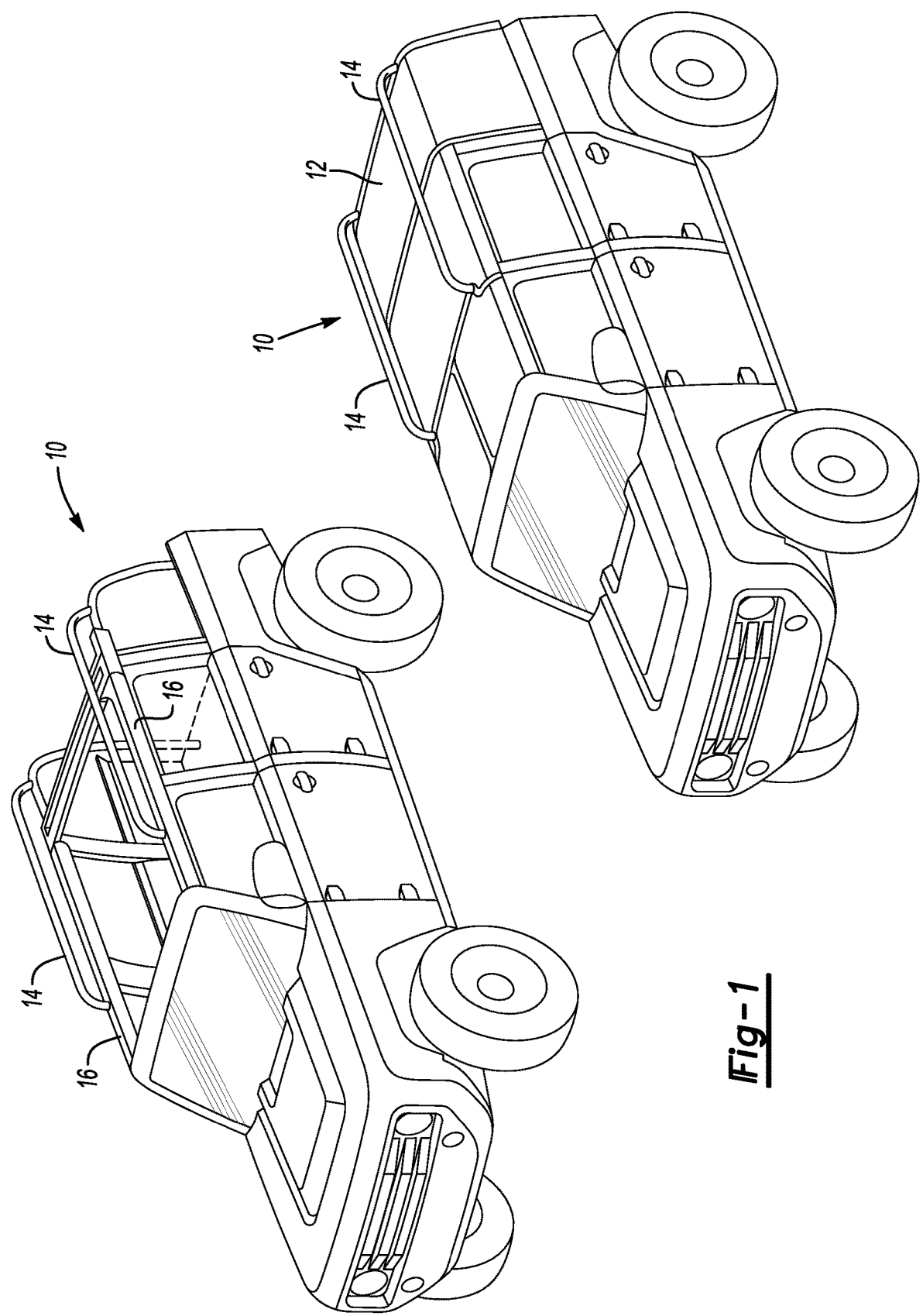
FIG. 1 is a schematic view of an example vehicle with removable roof panels.

Referring to FIG. 1, an example vehicle 10 is shown including a plurality of removable panels 12. Because the panels 12 are removable, an accessory item, such as a roof rack 14, may not be attached directly to the roof, and therefore is secured to structural features of the vehicle 10.

Referring to FIG. 2 with continued reference to FIG. 1, an example accessory item such as the roof rack 14 is mounted to the vehicle 10 with a lock assembly 32. The lock assembly 32 enables the roof rack 14 to be supported on the vehicle structure 16, separate from the roof panels 12. A mount 18 is affixed to a portion of the vehicle structure 16 and includes a bore 22 that receives the lock assembly 32. The lock assembly 32 is attached to a flange 30 of the roof rack 14 that extends through an opening 34 in the panel 12. The mount 18 includes an interior surface with a groove 28 that receives locking elements of the lock assembly 32.

In this example, the accessory item 14 is a roof rack. However, other accessory items such as light bars, tie-downs, and other roof rack accessories, could also be utilized with, and are within the contemplation and scope of this disclosure.

Referring to FIGS. 3 and 4, the example mount 18 includes the inner bore 22 that includes an open top 24 and bottom 26. The groove 28 is provided on the interior surface for the bore 22. The example bore 22 is disposed within a cylindrical structure that is attached to a flange 20. The flange 20 is attached to the vehicle structure 16. The example flange 20 is generally rectangular, and provides for the bore 22 to be disposed in a vertical orientation relative to the vehicle structure 16. While the example mount 18 is shown in a vertical orientation, the mount 18 and the bore 22 may be disposed in other angles and positions as is required to support accessory items. Moreover, while the bore 22 is shown as part of a mount 18 separate from the vehicle structure 16, the bore 22 and mount 18 may be an integral feature of the vehicle structure 16 or any other vehicle component. Additionally, the shape of the mount may be different than the disclosed cylindrical structure such as a rectangular block or other shape.

Figure 5:
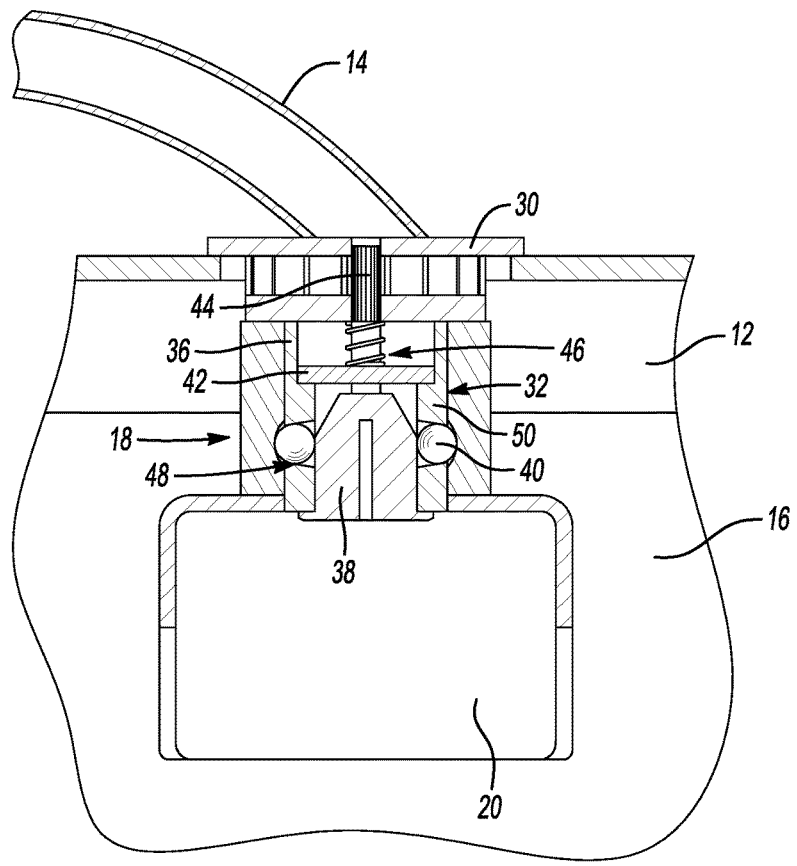
FIG. 5 is an enlarged cross-sectional view of an example lock assembly.

Referring to FIG. 5, the example lock assembly 32 is shown in cross-section and is received within the bore 22 of the mount 18. The example lock assembly 32 includes a housing 36 that is attached to a flange 30 of the accessory item 14. The housing 36 includes a flange 50 and openings 48. A plurality of bearings 40 are disposed within the housing 36 and are held between inner walls of the housing 36 near the openings 48 and a lock cylinder 38. The lock cylinder 38 is coupled to a lever 42 by a shaft 44. The lever 42 is biased downward by a biasing spring 46.

The lock cylinder 38 is held in a lock position illustrated in FIG. 5 by the lever 42 that engages the flange 50 of the housing 36. Rotation of the lock cylinder 38 enables the lever 42 to become free of the flange 50 such that the biasing spring 46 pushes the lever 42 downward. The lock cylinder 38 includes surfaces that enable the bearings 48 to recede from the windows 48 and disengage from the grooves 28 disposed within the mount 18.

Figure 6:
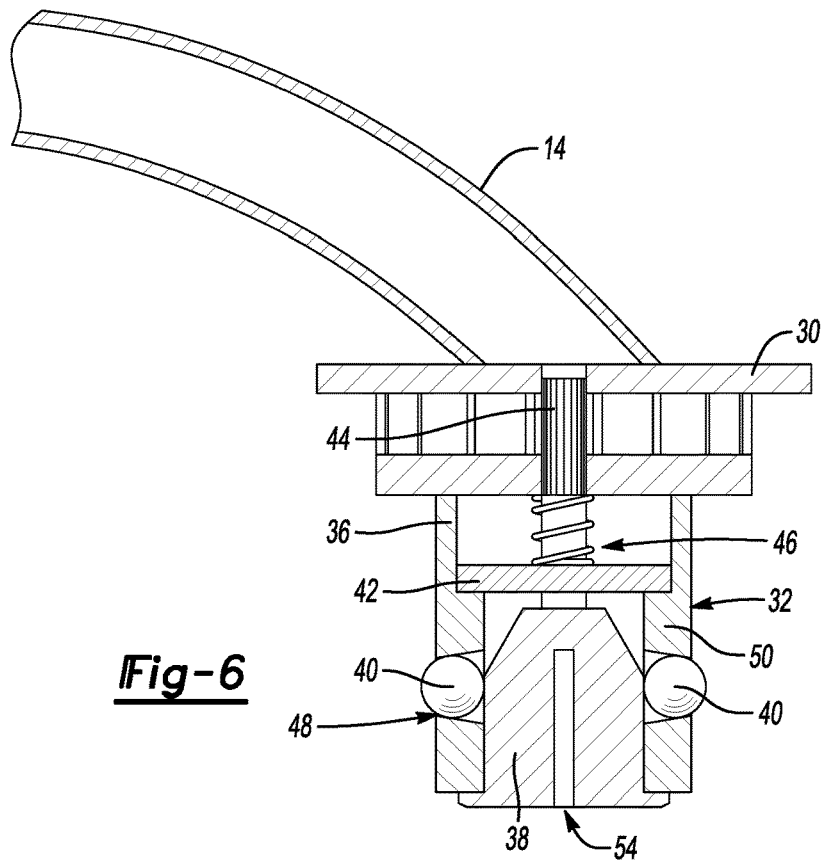
FIG. 6 is a cross-sectional view of a roof mount accessory item and an example lock assembly.
Figure 7:
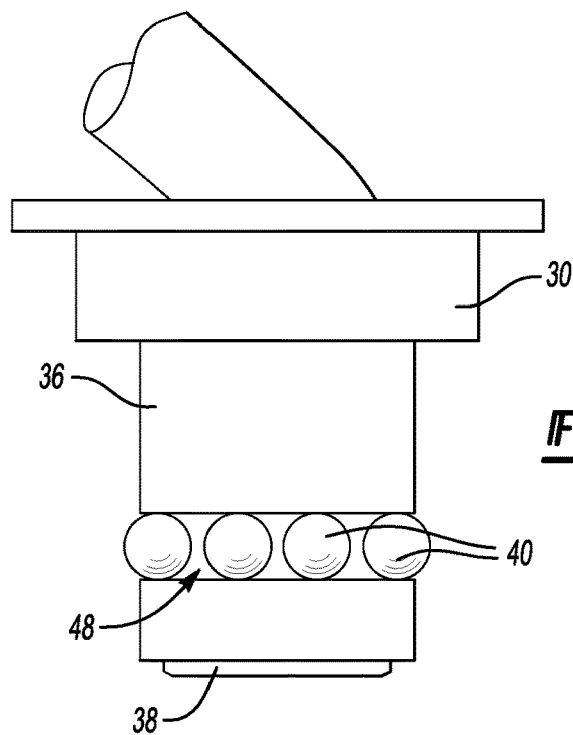
FIG. 7 is a side view of the example lock assembly.

Referring to FIGS. 6 and 7, the example lock assembly 32 is illustrated without the mount 18 and includes the lock cylinder 38, which includes a slot 54 that receives a key 52. The key 52 is required to rotate the lock cylinder 38. Because the vehicle includes removable panels 12, in many instances the interior may be accessible to unauthorized persons. Accordingly, the example accessory item 14 is locked to the vehicle by way of the lock cylinder 38. Rotation of a lock cylinder 38 can only be accomplished through use of a key 52 to thereby prevent unauthorized removal of the accessory item 14.

The bearings 40 move into the windows 48 and extend outward from the housing 36 to engage the groove 28 of the mount 18. The bearings 40 within the groove 28 lock the lock assembly 32 within the mount 18.

The lock cylinder 38 is coupled to the lever 42 by way of the shaft 44. Rotation of the lock cylinder 38 rotates the lever 42 such that it may disengage from the flange 50 disposed and formed on the interior surface of the housing 36.

Referring to FIG. 7 with continued reference to FIG. 6, the bearings 40 extend outward from the windows 48 when in the locked position as is illustrated in FIG. 6. The external surface of the housing 36 includes the window 48 through which the bearings 40 extend. The windows 48 are of a size that enable a portion of the bearings 40 to extend therethrough but maintain the bearings 40 within the housing 36.

Figure 8:
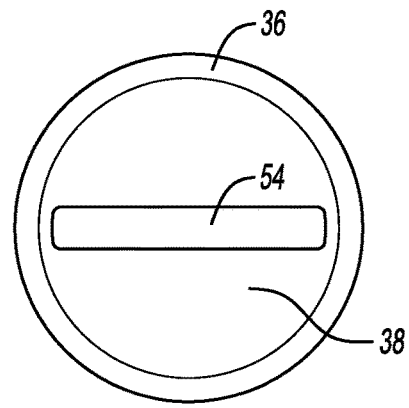
FIG. 8 is a bottom view of the example lock assembly.

Referring to FIG. 8, a bottom view of the example lock cylinder 38 is illustrated and includes the slot 54 to receive the key 52. It should be appreciated that although a key and slot are illustrated by way of example, other locking configurations could be utilized that are within the compilation and scope of this disclosure.

Figure 9A:
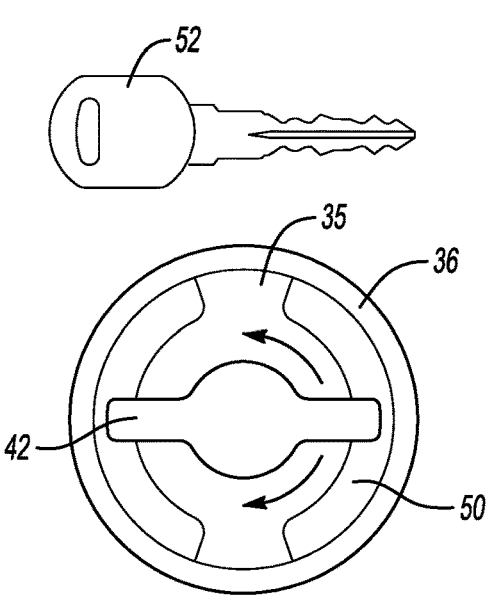
FIG. 9A is a cross-sectional view of a portion of the example lock assembly in a locked position.

Referring to FIG. 9A, the lever 42 is shown in a locked position, that includes the lever 42 engaged to the flange 50 of the housing 36. In the position illustrated in FIG. 9A, the lever 42 is engaged to the flange 50 such that the biasing spring 46 cannot push the lever 42 downward past the flange 50.

Figure 9B:
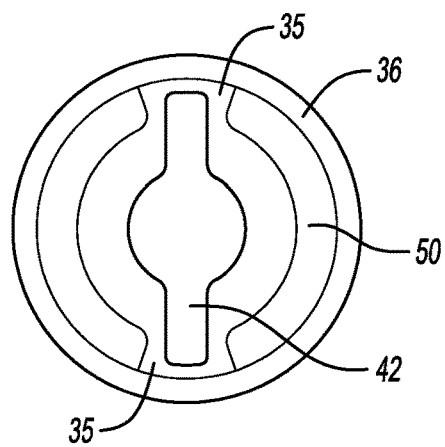
FIG. 9B is a cross-section of a portion of a lock assembly in a released position.

Referring to FIG. 9B with continued reference to FIG. 9A and FIG. 6, the lever 42 is shown in a released position, where the lever 42 is rotated and is movable through slots 35 defined within the flange 50. Accordingly, the flange 50 only extends partially about the interior of the housing 36. With the lever 42 disposed and aligned with the slots 35, the biasing member 46 pushes the lever passed the flange 50 to a released position.

Figure 10A:
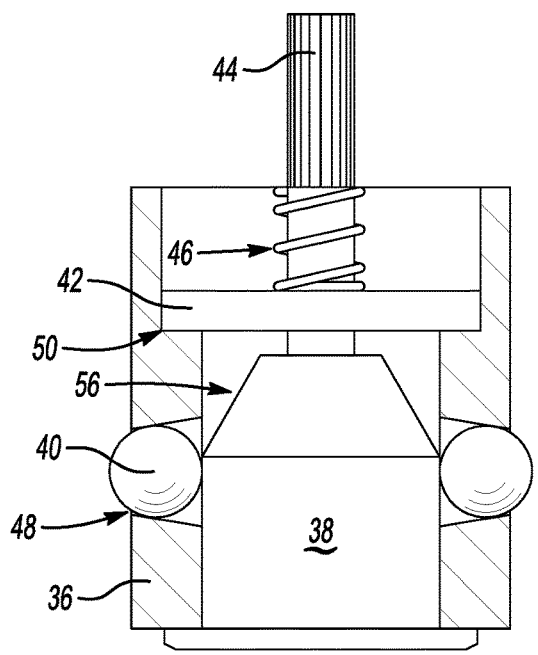
FIG. 10A is another cross-sectional view of the example lock assembly in a locked position.
Figure 10B:
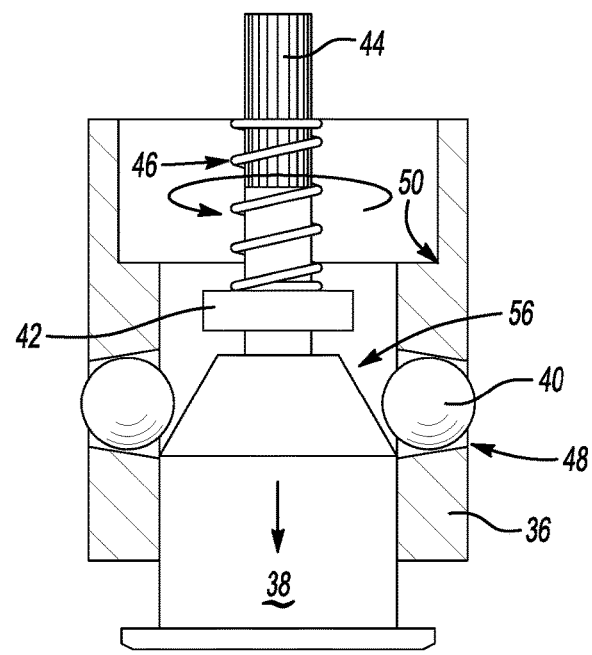
FIG. 10B is a cross-sectional view of the lock assembly in a released position.

Referring to FIGS. 10A and 10B with continued reference to FIGS. 9A and 9B, the example lock cylinder 38 is shown in cross-section and includes a surface 56. In this example, the surface 56 is a cone that ramps away from the interior surface of the housing. FIG. 10A illustrates the lock cylinder 38 in a locked condition where a side surface of the lock cylinder 38 maintains the bearings 40 within the window 48, such that the bearings 40 extend at least a portion outwardly from the exterior surface of the housing 36. The portion of the bearings 40 that extend outward from the housing 36 are received within the groove 28 of the mount 18 and secures the lock assembly 32.

Referring to FIG. 10B, when the lever 42 is rotated such that it is free to move downward, the biasing member 46 pushes the lock cylinder 38 downward, such that the cone surface 56 will align with the bearings 40. The cone surface 56 enables the bearings 40 to move inward and not project outwardly from the housing 36. Once the bearings 40 are moved inwardly, the lock assembly 32 is in a released position and may be removed from the example mount 18.

Figure 11A:
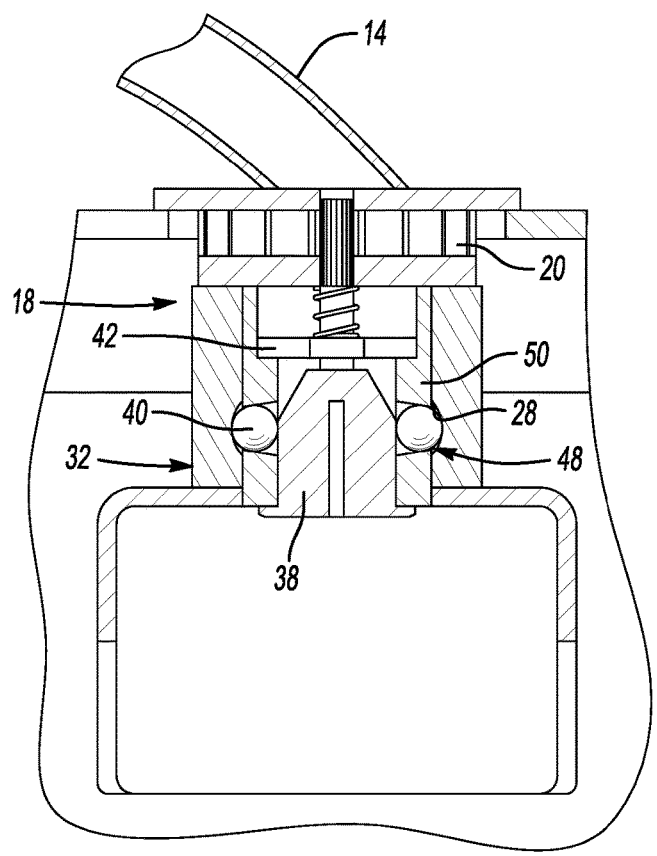
FIG. 11A is a cross-sectional view of the lock assembly in a locked position.

Referring to FIG. 11A, the lock assembly 32 is shown in a locked position where the bearings 40 are extended at least partially through the housing 36 into the grooves 28. The lever 42 is engaged to the flange 50, and thereby the biasing member 46 is not able to push downward on the lock cylinder 38.

Figure 11B:
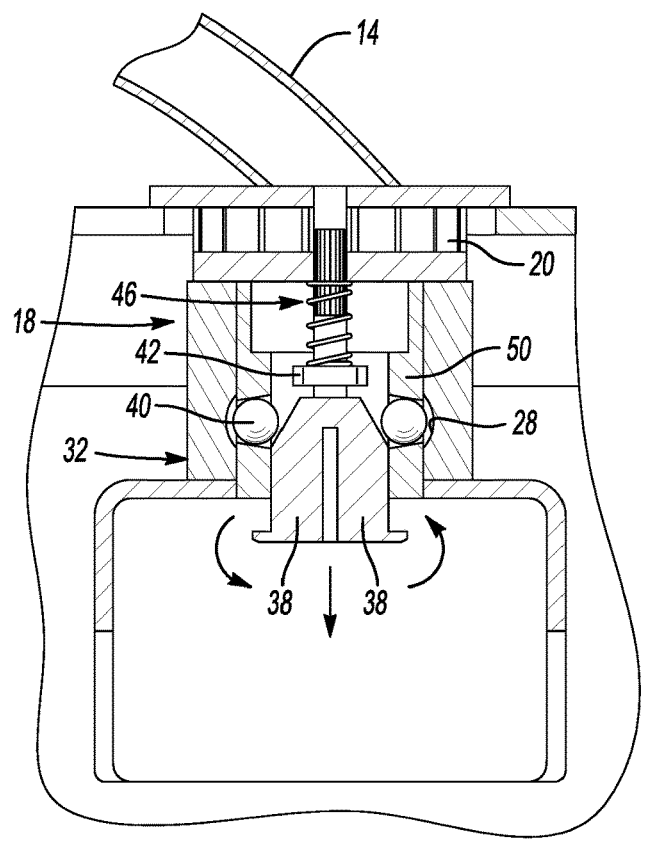
FIG. 11B is a cross-sectional view of the lock assembly in a released position.

Referring to FIG. 11B, the lock cylinder 38 is rotated such that the lever 42 is free of the flanges 50 and is moved downward such that the bearings 40 align with the cone 56. The cone 56 is a ramp surface that ramps inwardly to enable the bearings 40 to move inwardly from the windows 48. The shaft 44 is held within the mount flange 30 of the accessory item 14. Movement of the bearings 40 from the grooves 28 of the corresponding mount 18 unlocks the lock assembly 32 and enables removal of the accessory item 14.

Figure 11C:
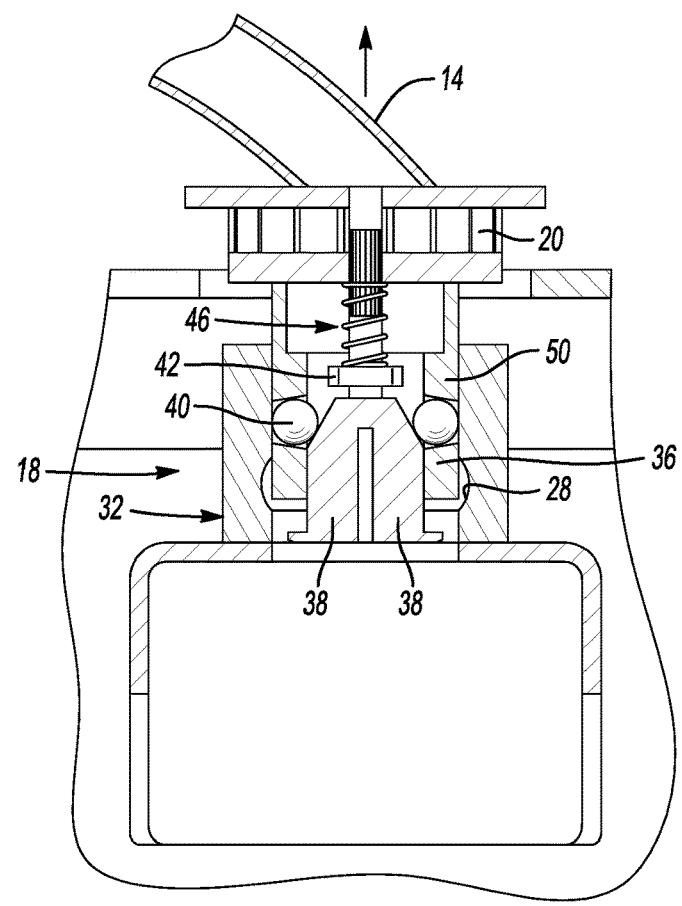
FIG. 11C is a cross-sectional view of the lock assembly being removed from an example mount.

Referring to FIG. 11C, once the lock assembly 32 is moved to the released position as shown in FIG. 11B, the lock assembly 32 and accessory item 14 may be pulled upward out of the mount 18. The roof panels 12 may then be removed as desired.

Installation of the accessory item 14 includes inserting the housing 36 of the lock assembly 32 into the mount bore 22. The lock cylinder 38 is then pushed upward and rotated to move the lever 42 through the slots 35 and into alignment with the flange 50. The upward movement of the lock cylinder 38 drives the bearings 40 outward on the cone 56 to extend at least partially through the openings 48 and into engagement with a groove 28 of a corresponding mount 18.

Accordingly, the example lock assembly enables assembly and removal of accessory items on a vehicle with removable panels and roof structures. Additionally, the example disclosed lock assembly secures the accessory item to a vehicle structure to prevent unauthorized removal.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. An accessory mount for a vehicle comprising:
   a housing including openings and a flange;
   at least one bearing;
   a lock cylinder movable within the housing and holding the at least one bearing in a locked position extending through the openings and a released position wherein the at least one bearing is not held within the openings;
   a lever coupled to the lock cylinder and disposed within the housing, wherein the lock cylinder is held in the locked position when the lever engages the flange of the housing; and
   a mount including a groove receiving the at least one bearing in the locked position.

2. The accessory mount as recited in claim 1, including a biasing member biasing the lever and the lock cylinder toward the release position.

3. The accessory mount as recited in claim 2, wherein the flange includes a slot and the lever is movable through the slot to the release position.

4. The accessory mount as recited in claim 3, wherein the at least one bearing is held between a bottom surface of the flange and the lock cylinder such that movement of the locking cylinder into the housing pushes the at least one bearing outward partially through the openings in the housing and at least partially within the groove of the mount.

5. The accessory mount as recited in claim 4, wherein the lock cylinder includes a slot receiving a key to enable rotational movement of the lock cylinder within the housing.

6. The accessory mount as recited in claim 5, wherein rotation of the lock cylinder moves the lever into alignment with the slot to enable movement to the release position.

7. The accessory mount as recited in claim 1, including a shaft coupling the lever and the lock cylinder.

8. The accessory mount as recited in claim 1, including an accessory item mounted to the housing.

9. The accessory mount as recited in claim 1, wherein the mount comprises a cylinder with an inner bore including the groove and the housing comprises a cylinder received within the inner bore such that the openings align with the groove in the locked position.

10. The accessory mount as recited in claim 9, wherein the mount includes a mounting flange securable to a fixed structure of the vehicle.

11. The accessory mount as recited in claim 9, wherein the housing is received through a top opening of the inner bore and the lock cylinder is accessible through a bottom opening of the bore.

12. A roof accessory for a motor vehicle comprising:
    a housing including openings and a flange;
    at least one bearing;
    a lock cylinder movable within the housing and holding the at least one bearing in a locked position extending through the openings and a released position wherein the at least one bearing is not held within the openings; and
    a lever coupled to the lock cylinder and disposed within the housing, the lever biased toward the flange of the housing by a biasing member, wherein the lock cylinder is held in the locked position when the lever engages the flange and the biasing member biases the lever and the lock cylinder toward the released position.

13. The roof accessory as recited in claim 12, wherein the at least one bearing is held between a bottom surface of the flange and lock cylinder such that movement of the locking cylinder into the housing pushes the at least one bearing outward partially through the openings in the housing and at least partially within a groove of a mount.

14. The roof accessory as recited in claim 13, wherein the lock cylinder includes a slot receiving a key to enable rotational movement of the lock cylinder within the housing and rotation of the lock cylinder moves the lever into alignment with the slot to enable movement to the release position.

15. The roof accessory as recited in claim 14, wherein the housing is cylindrical and receivable within an inner bore of a mount, wherein the inner bore includes a groove for receiving the at least one bearing in a locked position.

16. The roof accessory as recited in claim 15, wherein the housing is received through a top opening of the inner bore and the lock cylinder is accessible through a bottom opening of the bore.

\* \* \* \* \*